United States Patent Office 3,088,169
Patented May 7, 1963

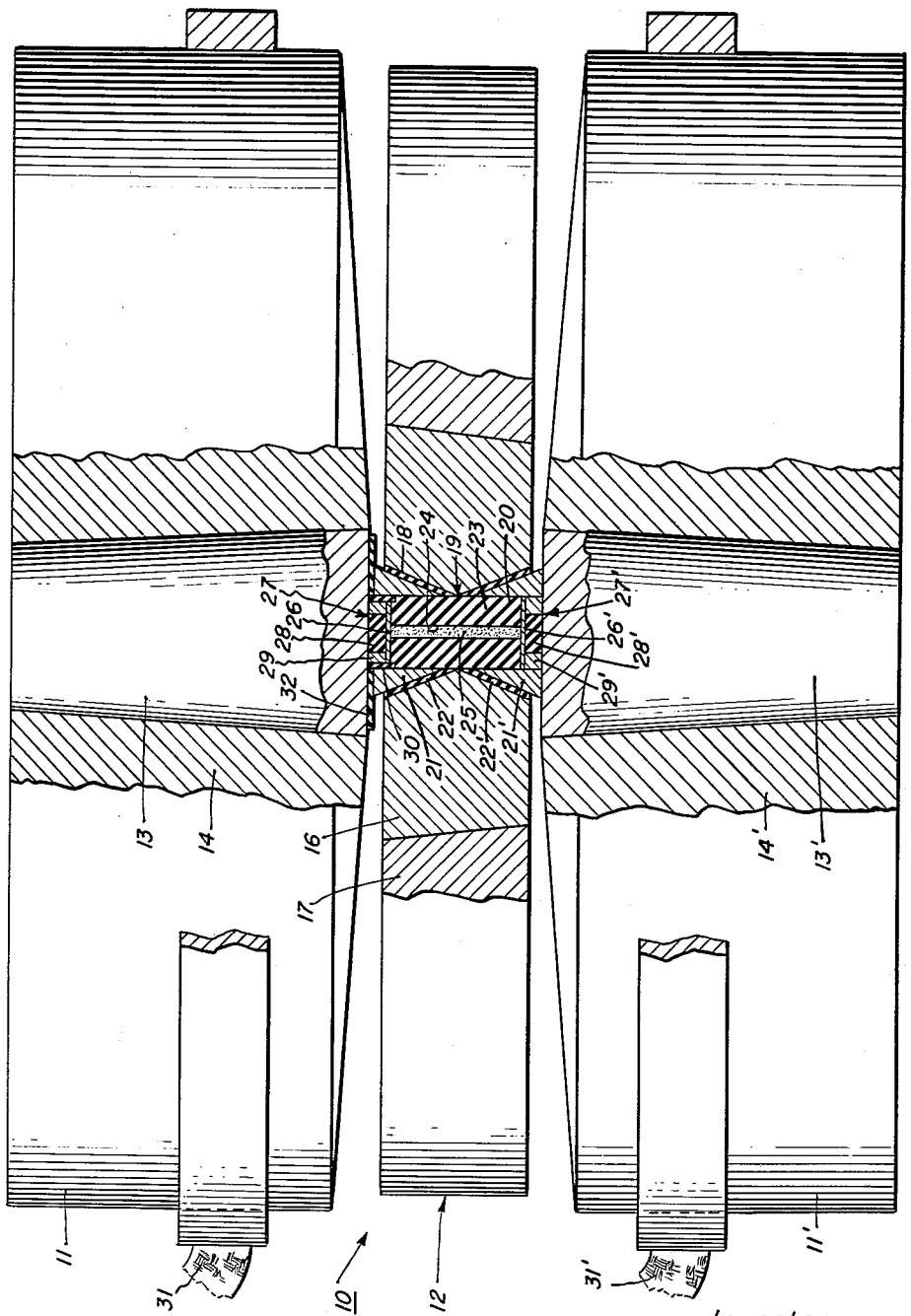

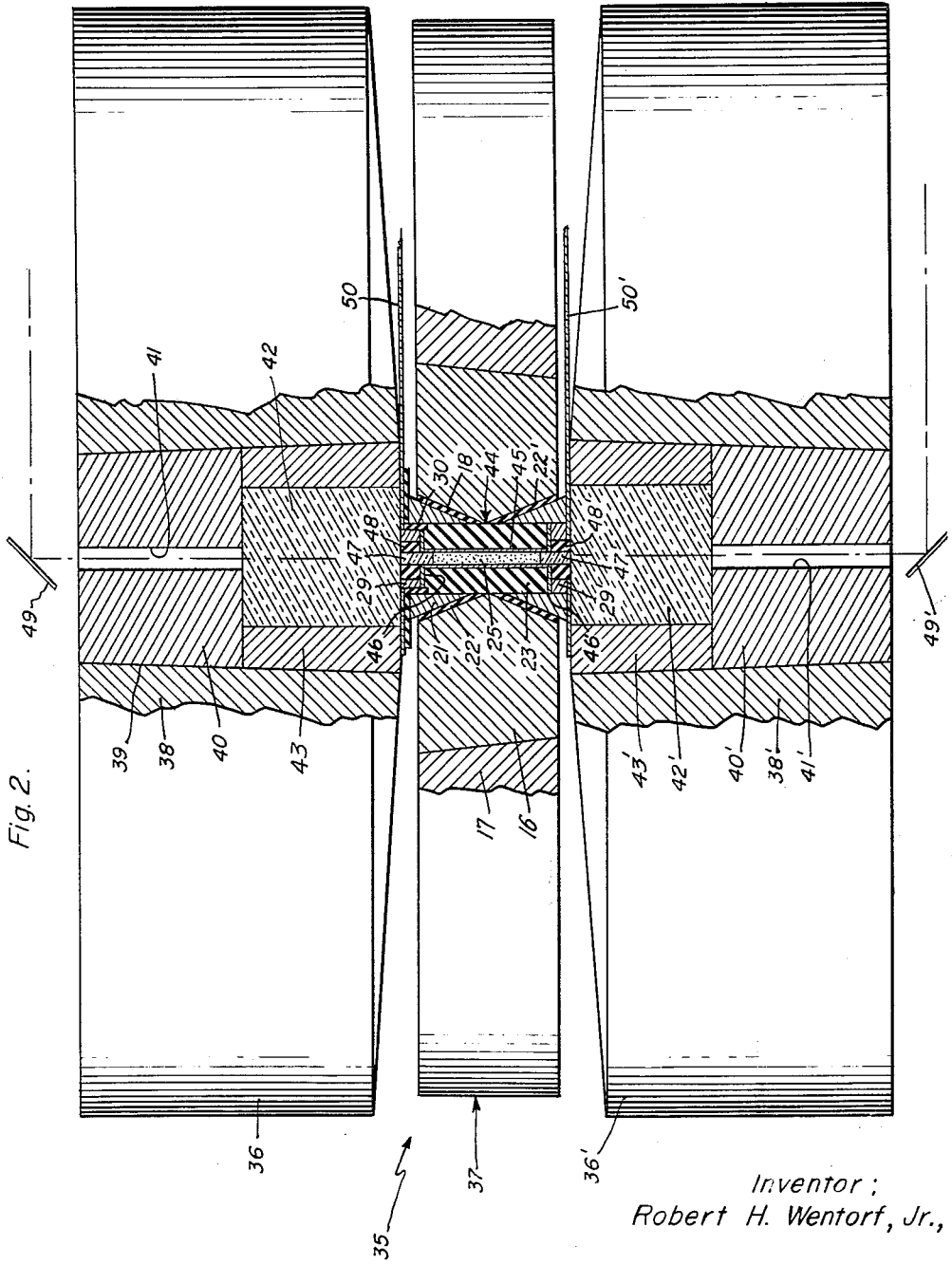

3,088,169
HIGH PRESSURE, HIGH TEMPERATURE
APPARATUS
Robert H. Wentorf, Jr., Schenectady, N.Y., assignor to
General Electric Company, a corporation of New York
Filed Jan. 3, 1961, Ser. No. 80,426
11 Claims. (Cl. 18—16)

This invention relates to an improved high pressure high temperature apparatus and more particularly, to an apparatus having improved pressure transmitting characteristics together with optical indication means for study of a specimen material under high pressure high temperature conditions.

Generally, high pressure high temperature apparatuses, for example, the "belt" apparatus as disclosed in U.S. Patent 2,941,248, employ a pair of oppositely directed or opposed punches which progress into an opening in a concentrically positioned die to compress a sample material therein. Pressure within this type of apparatus ordinarily depends on a reaction vessel of a given material, for example, various ceramics or stones such as catlinite, pyrophyllite, talc, etc., to transmit pressure from the punches to the specimen material. It is greatly preferred that such high pressures be transmitted in a truly hydrostatic manner or as substantially hydrostatic as a given material will provide. Such hydrostatic transmission of pressures is best achieved through liquids (Pascal's principle), but under extreme high pressure high temperature conditions, liquid is difficult to maintain in the apparatus, and may not remain a liquid or act as a liquid under extreme high pressure high temperature conditions.

Together with improved pressure distribution in a high pressure apparatus, there presently are no optical or graphic recording means which will provide visual examination of the specimen under the given conditions. Such a provision of optical mean or means which will provide a graphic representation of the condition of the specimen in the reaction vessel at such high pressures and high temperatures is desirable in the furthering of knowledge of the effect of these conditions on various specimens.

Additionally, there is desired an improved apparatus where more economical, or more economically prepared elements, and more easily prepared elements are utilized so that involved or intricate shapes of difficult to work materials may be replaced, and so that the elements which are most subject to breakage are modified to be easily replaced and less expensive.

Accordingly, it is an object of this invention to provide an improved high pressure high temperature apparatus.

It is another object of this invention to provide an improved high pressure high temperature apparatus which will transmit pressures to the specimen material in a more hydrostatic manner.

It is yet another object of this invention to provide optical or graphic representation of the condition of the specimen under the extreme conditions of high pressures combined with high temperatures.

It is another object of this invention to provide more easily manufactured and replaceable parts in a high pressure, high temperature apparatus.

It is another object of this invention to provide more simple part configurations of greater strength.

Briefly described, this invention in one form includes a pair of opposed anvil members which push against a pair of apex opposed conical sleeves in a conical opening to compress a specimen material within the conical sleeves.

This invention will be better understood when taken in connection with the following descriptions and the drawings in which:

FIG. 1 is a preferred form of a high pressure high temperature apparatus to be employed in accordance with the teachings of this invention; and FIG. 2 is a modification of the apparatus of FIG. 1 including visual observation means.

Referring now to FIG. 1, there is illustrated a preferred form of high temperature high pressure apparatus 10. Apparatus 10 comprises a pair of anvil members 11 and 11' and an intermediate concentrically positioned pressure resisting member or die assembly 12. Each anvil assembly 11 and 11' is similar in design and construction and each includes a flat-faced block 13 and 13' of a very hard material, for example, Carboloy cement tungsten carbide, which is press or shrunk fitted within one or more hard steel binding or supporting rings 14 and 14'. Supporting rings 14 are employed to resist the high stresses imposed upon the blocks 13 and 13'.

Die assembly 12 includes a central die member 16 which is also laterally supported by means of one or more hard steel supporting rings 17 which may be shrunk fitted or press fitted to provide a high degree of support. Die member 16 in one preferred example, is of a hard steel hardened to the Rockwell hardness number of C60. Die 16 includes therein a central aperture 18 which may be best described as a convergent divergent opening through die 16. Alternately, opening 18 may be described as a pair of equal oppositely formed frustoconical openings in opposed apex relationship. While in either instance, these openings are illustrated as having walls of straight lines in cross section, these walls may be appropriately arcuately tapered or flared much in the same manner as the die opening in the Hall Patent 2,941,248.

With opening 18, there is positioned an assembly 19 which includes a reaction vessel 20, a pair of force cone assemblies or taper members 21 and 21', and a pair of insulating and lubricant cone assemblies 22 and 22'.

Reaction vessel 20 is similar to the reaction vessel as disclosed in the aforementioned Hall patent. The central member 23 of reaction vessel 20 is, in one preferred form, an electrically nonconductive cylinder having an opening 24 therethrough. Opening 24 is considered to be the reaction volume and contains a sample material 25, or a thin metal, or otherwise electrically conductive tube, to contain a sample material. Cylinder 23 is closed at each end by concentrically positioned electrically conductive metal discs 26 and 26'. To complete the reaction vessel, end cap assemblies 27 and 27' are also concentrically positioned adjacent each disc 26 and 26'. End cap assembly 27 includes an electrically nonconductive disc 28 which is surrounded by an electrically conductive ring 29. End cap assembly 27, although similar in all respects to end cap assembly 27', is reduced in outside diameter in order to accommodate an electrically nonconductive sleeve 30 which may also extend to include a shoulder on cylinder 23. Disc 26 is also of smaller diameter than disc 26' in order to accommodate sleeve 30. Suitable examples of reaction vessel nonconducting materials are various ceramics and stones such as catlinite, pyrophyllite, talc or other materials which will maintain electrically nonconductive characteristics at high pressures and high temperatures. These materials must also be capable of transmitting high pressures in a hydrostatic manner and compress without undue spalling to minimize pressure loss. It is understood that the reaction vessel configuration is exemplary as cylindrical and may take various forms both geometrical and irregular, for example, combinations of spheres, cubes, etc.

Lateral compression of the sample material 25 and reaction vessel 20 is provided by means of force cones 21. Force cones 21 are best described as relatively thin hard steel frustoconical elements having a cylindrical opening longitudinally therethrough to closely fit the side wall of reaction vessel 20. A pair of these cones as illustrated in FIG. 1, are positioned in opposed apex relationship to surround the reaction vessel with their apexes in spaced apart relationship and with their frustoconical surfaces substantially parallel to the frustoconical surfaces of opening 18. The bases of these force cones 21 essentially rest upon the flat faced blocks 13 and 13'. Since the force cones are adapted to slide relative to the walls of opening 18, further cone members 22 which permit the sliding motion and which compress and provide additional motion together with electrical insulating qualities, are provided between the walls of opening 18 and the outer frustoconical walls of force cone 21. Cone members 22 are made of the same materials as described for the electrically nonconducting parts of reaction vessel 20, and may also be of various other materials both lubricant and/or insulating.

The assembly of FIG. 1 is adapted to be positioned between the platens of a suitable press apparatus so that motion of one or both anvil assemblies 11 and 11' serves to apply an axial force to and compress the specimen in the reaction vessel and the reaction vessel attempts to expand laterally. However, when anvil 13, for example, moves towards anvil 13', stone cones 22 are compressed to provide axial motion of force cones 21 towards each other and continued movement of anvil 13, cone members 21 prevent radial distention of the reaction vessel because the taper on the frustoconical opening 18 attempts to force the cone members 21 radially inwardly to compress the reaction vessel and specimen therein. Additionally, motion of anvils 13 and 13' pushing or applying an axial force on end cap assemblies 27 and 27' compresses the reaction vessel and specimen in the vertical direction. It can thus be seen that both vertical or axial and lateral pressures are exerted on the reaction vessel, and together with the hydrostatic pressure transmitting characteristics of the materials employed, substantially hydrostatic pressures are developed within the specimen 25. This combination is obtained by simple parts of high strength, and because of their simplicity, with more economical materials.

Heating of the sample material 25 may be best accomplished with electrical resistance heating, either by utilizing the sample material where it is electrically conductive, or by the use of suitable heaters in the sample material or a metal electrically conductive jacket encasing the sample. Electrical power for electrical resistance heating is supplied by means of a pair of electrical conductors 31 and 31' connected to a suitable source of power (not shown) and to each anvil member 11 and 11'. The current path is then from either anvil, for example, anvil 13 through electrically conductive ring 26 which is usually of hard steel, thence through electrically conductive disc 26 which is usually metal, thence through the reaction specimen and in reverse order through disc 26', ring 29' and block 13'. Stone cones 22 prevent short-circuiting between die member 16 and force cones 21. At the same time, sleeve 30 prevents short-circuiting between ring 29' and force cones 21. Sleeve 30 material is the same as for the electrically insulating parts of reaction vessel 20. Force cones 21 may contact at their apexes at the end of anvil stroke and divert current. For this reason, sleeve 30 is employed for insulation purposes. A further annular disc 32 of asbestos or stone is positioned against the flat face of block 13 surrounding sleeve 30 and end cap 27 to provide electrical insulation between block 13 and die 16.

While one preferred embodiment of this invention illustrates each force cone 21 being an integral structure, it is, of course, obvious that these cones may be segmental radially and have compressible material stone gasketing between each segment to facilitate the reduction in internal diameter if necessary during press operation.

Because the elements employed to apply force to the apparatus are the flat-faced, high strength block members 13 and 13' which do not enter into the high temperature reaction zone, they may be suitably modified to provide specific observation means, such as illustrated in FIG. 2.

Referring now to FIG. 2, there is illustrated an apparatus 35 which includes a pair of anvil members 36 and 36' and a die member 37. These members are similar to the anvil assemblies 11 and 11' and die 12 of FIG. 1 in design and construction. Anvil member 36 is similar in all respects to anvil 36', and includes a hard steel supporting ring 38 having a tapered opening 39 therethrough. Within opening 39, there is positioned a Carboloy cemented tungsten carbide block 40 of about one half the thickness of ring 38. Block 40, in one preferred assembly, is press-fitted within ring 38 so that the bases of ring 38 and block 40 coincide. Block 40 has a central cylindrical aperture 41 extending therethrough. In the remaining forward portion of the opening 39, there is positioned an optical cylinder 42 and a steel supporting ring 43, ring 43 being press-fitted within steel supporting ring 38 to thereby hold the optical cylinder 42 in position. Optical cylinder 42 may be made of various materials, such as for example, sapphire, diamond, certain metal oxides, and spinels. By means of a sapphire cylinder 42 and opening 41 in block 40 an optical path to the reaction vessel 44 is obtained.

Reaction vessel 44 is suitably modified, from that in FIG. 1, to provide for optical observation. A metal tube 45 is employed within cylinder 23 to contain a specimen material and to provide electrical resistance heating current path.

Electrically conductive metal discs 46 and 46' are provided with apertures in which there is positioned an optical cylinder 47 and 47' which may progress into tube 45 at both ends of the specimen. A portion of each cylinder 47 and 47' projects into an aperture provided in electrically nonconductive discs 48 and 48' to abut optical cylinders 42 and 42'. It can thus be seen that suitably positioned lenses or mirrors, 49 and 49', may be employed, together with a camera, for example, to record images of the condition of the specimen 25 in reaction vessel 44 during subjection to high pressures and high temperatures. With respect to high temperatures, suitable conductors, for example, copper, annular discs 50 and 50' are placed between the upper anvil member 36 and insulation ring 32 to supply current from a source (not shown) to current ring 29, disc 46, through tube 45, and, in reverse, through disc 46', conducting ring 29' and conductor 50'. Operation of the apparatus of FIG. 2 is similar to that of FIG. 1.

Calibration for both pressures and temperatures may be made by various methods well known to those silled in the art. Temperatures may be measured in this apparatus through the observation recording means or through suitable thermocouples which are placed in the reaction volume to give a satisfactory accurate temperature measurement. Pressure calibration may be made in accordance with the calibration as described in the aforementioned Hall patent. This method of calibration entails known electrical resistance changes of given materials, for example, cesium, thallium, barium, and bismuth, under known pressures (P. W. Bridgman, "Proceedings of the American Academy Arts and Sciences," volume 81, IV, pages 165–251, March 1952) and correlated with the press force applied to the anvils. Two versions of this apparatus have been constructed, one of which employs an included angle of 46° for force cones 21, and another with an included angle of 24°.

In the 46° cone angle, anvil members were 6 inches O.D. and 2 inches thick. Die members were 6 inches O.D. and 0.75 inch thick. Reaction vessels were 0.350 inch O.D. and 0.65 inch in length. Force cones were 0.60 or 0.50 inch in base diameter and 0.37 inch in height. Stone cones were 0.040 inch in thickness. All electrical non-conducting parts were pyrophyllite. With these considerations, the 24,700 atmospheres bismuth resistance transition was obtained with a press force in the range of 115 to 135 tons. The dense form of silica, "Coesite," which requires a pressure of at least about 35,000 atmospheres for its formation, was obtained with a press force of about 185 tons, and temperature of about 700° C. After each run, the force cones and stone parts, of course, must be replaced.

With the same design considerations and for a 24 degree included cone angle, the 24,000 atmosphere bismuth transition occurred with a press force of between 60 and 90 tons. Coesite was also formed at about 700° C. and with a press force of about 140 tons.

This invention has been described as employing a pair of punches, one or both of which may be moveable. It is, of course, understood that the invention may be practiced with but one punch and a single frustoconical opening to thus be a single end apparatus.

It is thus understood by those skilled in the art that this invention provides an improved high pressure, high temperature apparatus employing parts of simple shape whereby, by means of force cones, pressures may be imposed upon a specimen material, both vertically and laterally, and where observation means are provided in order to study the effect of high pressure and high temperature conditions on specimens at those conditions.

While specific embodiments of this invention have been disclosed and described, it is not intended that the invention be limited to these specific embodiments since it will be apparent to those skilled in the art that various modifications in this apparatus are contemplated to be within the scope of this invention. It is therefore intended that the following claims include such modifications within the inventive scope thereof.

What I claim as new and desire to secure by Letters Patent of the United States is:

1. A high pressure, high temperature apparatus comprising in combination, a pair of opposed anvil members adapted to have relative motion therebetween towards each other, a lateral pressure resisting member positioned concentrically between said pair of anvils, said lateral pressure resisting member having a central tapered conical opening therein adapted to contain a specimen material to be subjected to high pressures and high temperatures, a hollow thin walled conical tapered member in said aperture and surrounding said specimen, gaset means between said tapered member and the walls of said aperture to compress and adapt said tapered member to slide axially with respect to the walls of said aperture and into said aperture, and means to move one of said anvils towards the other so that one of said anvils applies an axial force on said specimen and pushes said tapered member into said tapered opening to provide lateral and axial compression of said specimen.

2. A high pressure, high temperature apparatus comprising in combination, a pair of flat-faced anvil members positioned in opposed relationship and adapted to have relative motion therebetween, a die member positioned concentrically between said anvil members, said die member having a pair of opposed convergent openings therethrough adapted to have a specimen material placed therein to be subjected to high pressures and high temperatures, a hollow convergent force member positioned in each die member opening in concentric and opposed relationship to abut said anvils and to surround said specimen, means to move one of said anvils towards the other so that said anvils apply an axial force to said specimen and pushes on said hollow convergent members to push said members into said convergent openings to laterally and axially compress said specimen.

3. A high pressure, high temperature apparatus comprising in combination, a pair of opposed flat-faced anvil members adapted to have relative motion therebetween, a lateral pressure resisting die member having a central opening therein and positioned concentrically between said die members, said opening adapted to contain a reaction vessel having a specimen material placed therein to be subjected to high pressures and high temperatures, said opening defining a pair of frustoconical openings in apex to apex relationship, a hollow frustoconical steel force cone member concentrically positioned in each of said frustoconical openings and abutting said anvil members, and means to provide relative motion between said anvil members so that said anvil members pushes on said reaction vessel and said cone members to force said hollow cone members into said aperture to laterally and axially compress a specimen material in said reaction vessel.

4. A high pressure, high temperature apparatus comprising in combination, a pair of opposed flat-faced anvil members adapted to have relative motion therebetween towards each other, a lateral pressure resisting member positioned concentrically between said anvil members and having a tapered aperture therethrough, said tapered aperture adapted to contain a reaction vessel having a specimen material contained therein to be subjected to high pressures and high temperatures, a tapered force member positioned in said tapered aperture around said specimen and said reaction vessel so that said vessel and said tapered force member abuts said anvil members and motion of said anvil members towards each other against said reaction vessel and said tapered force members to force said tapered member into said tapered opening to provide lateral and axial compression of said specimen, one of said anvil members having an aperture therethrough leading to said reaction vessel, and optical material means in said aperture of said anvil member to provide an optical path to said reaction vessel.

5. The invention as claimed in claim 4 wherein said optical member is a light transmitting block positioned in each of said anvil members on each side of said reaction vessel.

6. The invention as claimed in claim 5 wherein said light transmitting member is a transparent block of material.

7. The invention as claimed in claim 6 wherein said transparent block is sapphire.

8. The invention as claimed in claim 7 wherein said transparent block is diamond.

9. A high pressure, high temperature apparatus comprising in combination an anvil member, a die member having a tapered opening therein and positioned concentrically with and opposing said anvil member, said tapered opening adapted to have a reaction vessel containing a sample material therein to be subjected to high pressure and high temperature, optical means in said reaction vessel to provide optical inspection of the sample material therein, a tapered force member positioned in said tapered opening about said specimen, gasket means between said tapered force member and the walls of said tapered opening, means to move said anvil member towards said die so that the said anvil member pushes on said reaction vessel and said tapered member to push said tapered member into said tapered opening to subject said specimen to axial and lateral compression, said anvil member having an axial aperture therethrough leading to said reaction vessel, and optical means including a transparent material block in said aperture to provide optical examination through said optical means in said reaction vessel of the condition of said specimen.

10. A high pressure, high temperature apparatus comprising in combination, a pair of flat-faced anvil members positioned in opposed relationship, optical means in each of said anvil members including a transparent block of hard material to provide an optical path through said anvil members, a die member concentrically positioned between said flat-faced anvil members, said die member having an aperture therethrough defining a pair of frustoconical openings in opposed apex relationship, said aperture adapted to contain a reaction vessel having a specimen material placed therein to be subjected to high pressures and high temperatures, a hollow frustoconical steel force member positioned concentrically within each frustoconical opening in spaced apart opposed apex relationship to abut said anvil members and surrounding said reaction vessel, means electrically insulating said anvil members from said die member, gasket means electrically insulating said force members from said die member, means to move one of said anvil members towards the other to apply a direct axial force to said reaction vessel and so that the said force members move into said die aperture and the specimen is compressed axially and laterally, and electrical resistance heating means operatively connected to said reaction vessel to raise the temperature of the specimen therein.

11. The invention as recited in claim 10 wherein said reaction vessel comprises in combination, a hollow electrically non-conductive cylinder to contain a specimen material therein, an electrically conductive metal tube concentrically positioned therein, an electrically conductive annular electrically conductive metal washer concentrically positioned on each end of said cylinder and tube and engaging said tube, a hard cylinder of transparent material fitting within said washer and tube and projecting therefrom, an electrically insulating annular disc surrounding the projecting portion of said transparent cylinder, and an electrically conductive metal ring surrounding said disc so that electrical current may be supplied to said tube to heat the specimen therein and during compression of said vessel said transparent blocks maintain an optical path to said specimen.

References Cited in the file of this patent

UNITED STATES PATENTS

| | | |
|---|---|---|
| 2,125,068 | Dempsey | July 26, 1938 |
| 2,320,696 | Zoll | June 1, 1943 |
| 2,330,762 | Tooker | Sept. 28, 1943 |
| 2,483,803 | Bridgeman et al. | Oct. 4, 1949 |
| 2,941,241 | Strong | June 21, 1960 |
| 2,941,248 | Hall | June 21, 1960 |

FOREIGN PATENTS

| | | |
|---|---|---|
| 1,178,560 | France | May 12, 1959 |